United States Patent [19]
Vogman

[11] Patent Number: 6,018,472
[45] Date of Patent: Jan. 25, 2000

[54] METHOD AND APPARATUS FOR POWER FACTOR CORRECTION

[75] Inventor: Viktor D. Vogman, Olympia, Wash.

[73] Assignee: Intel Corporation, Santa Clara, Calif.

[21] Appl. No.: 09/055,849

[22] Filed: Apr. 6, 1998

[51] Int. Cl.$^7$ .................................................. H02M 7/06
[52] U.S. Cl. ............................................. 363/126; 363/89
[58] Field of Search ................................ 363/34, 44, 124, 363/125, 126, 59, 60, 61

[56] References Cited

U.S. PATENT DOCUMENTS

| | | | |
|---|---|---|---|
| 4,716,512 | 12/1987 | Takamura et al. | 363/61 |
| 5,285,370 | 2/1994 | Axer et al. | 363/59 |
| 5,532,917 | 7/1996 | Hung | 363/67 |
| 5,543,668 | 8/1996 | Fong | 363/60 X |
| 5,748,032 | 5/1998 | Baek | 363/59 |
| 5,781,427 | 7/1998 | Moreau | 363/143 |

OTHER PUBLICATIONS

A Viable Passive Power Factor Corrector For Bootstrap Modified Switchmode Converters, by J. Brian Matley, Protec Industries, Sep. 1991, pp. 278–296.

*Primary Examiner*—Y. J. Han
*Attorney, Agent, or Firm*—Blakely, Sokoloff, Taylor & Zafman LLP

[57] ABSTRACT

A method and apparatus for power factor correction. The present invention provides passive power factor correction for power supplies that supply more than 200 Watts. In one embodiment, power factor correction is provided for over 500 Watt power supplies. A diode bridge circuit provides a rectified voltage output from an alternating current input. A correction circuit receives the rectified voltage and provides power factor correction. The output of the correction circuit is the input to a load circuit, such as an alternating current to direct current circuit.

13 Claims, 4 Drawing Sheets

METHOD AND APPARATUS FOR POWER FACTOR CORRECTION

FIELD OF THE INVENTION

The present invention relates to power supplies for electrically powered devices; more particularly, the present invention relates to correction of power factor for electrically powered devices.

BACKGROUND OF THE INVENTION

In the prior art, power factor correction has been used in a number of environments because improved power factor results in decreased root mean square (RMS) alternating current (AC) line current drawn by the device having power factor correction. For example, the power factor of a standard (uncorrected) power supply is typically in the range of 0.5 to 0.65. Power factor correction can improve power factor to the range of 0.95 to 0.99. Such an improvement in power factor may decrease RMS AC line current consumption by up to 50%.

Power factor correction may be provided by either active components or passive components. Active power factor correction is typically used in power supplies rated at 200 Watts or more and is in the form of a power factor preregulator which is a complex device interposed between an input rectifier bridge and a bulk filter capacitor of a power supply. Use of active power factor correction provides input AC current signals that approximate a sine function with low levels of distortion; however, active components increase the cost of a power supply. Active power correction may increase the cost of a power supply by as much as 25–30%. Therefore, active power factor correction is typically used in high end power supplies.

Passive power correction is often used for power supplies rated at less than 200 Watts. Passive power correction circuits provide greater reliability at a lower cost than active power correction circuits for power supplies up to 200 Watts. In the prior art, at approximately 200 Watts, active power factor correction becomes less expensive because high-power passive elements such as capacitors and inductors become more expensive as power rating increases. Passive power factor correction is typically provided either by a low frequency inductive circuit, or by a capacitor-diode (C/D) circuit. Each type of circuit provides power factors in the range of 0.9 to 0.95. However, in the prior art these passive power correction circuits are typically not used for power supplies that provide over 200 Watts of power because costs of passive power correction equal or exceed costs of active power correction.

What is needed is a cost-effective passive circuit that provides power factor correction for power supplies that supply more than 200 Watts of power.

SUMMARY OF THE INVENTION

A method and apparatus for power factor correction is described. A bridge circuit receives an alternating current input and provides a rectified voltage waveform output to a correction circuit that provides a conduction when voltage output from the bridge circuit exceeds a predetermined level for each voltage half cycle and power delivery from storage components otherwise.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

A method and apparatus for power factor correction is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Briefly, the present invention provides passive power factor correction for power supplies that supply more than 200 Watts as well as power supplies that supply 200 Watts or less. In one embodiment, power factor correction is provided for power supplies that provide up to 500 or more Watts of power. A diode bridge circuit provides a rectified voltage output from an alternating current (AC) input. A correction circuit receives the rectified voltage and provides the input to a load circuit that approximates a rectified sine wave voltage. In one embodiment, the load circuit converts the input voltage to a direct current (DC) output signal that may be used, for example, to provide DC power to a computer system of other electronic device.

Figure 1:
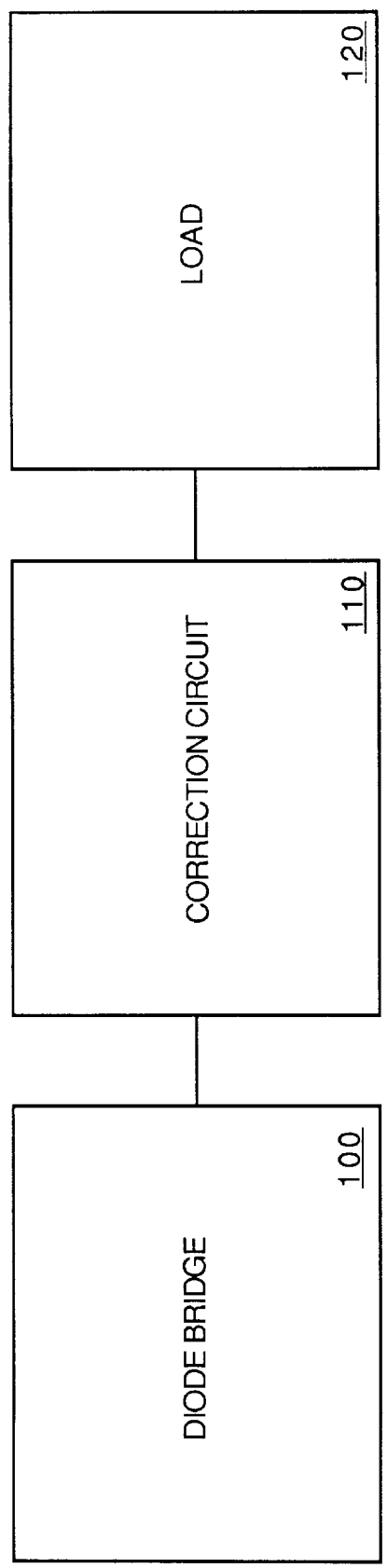
FIG. 1 is one embodiment of a high-level block diagram of a power factor correction apparatus according to the present invention.

FIG. 1 is one embodiment of a block diagram of a power factor correction apparatus according to the present invention. Diode bridge 100 receives as input (not shown in FIG. 1) an AC voltage input. In one embodiment, the input voltage is 220 $V_{AC}$. Of course, other AC voltage inputs, such as 110 $V_{AC}$ could be used. For these applications the correction circuit can be used with a voltage doubler. In one embodiment, diode bridge 100 is a standard diode bridge rectifier. It is important to note that the components of diode bridge 100 are devices that are rated to handle the input voltage received. Of course, other rectification schemes, such as a voltage doubler, could also be used.

Correction circuit 110 is coupled to receive the output of diode bridge 100. Correction circuit 110 provides power factor correction to the device connected to the AC line through diode bridge 100. In one embodiment, correction circuit 110 comprises multiple capacitors and diodes (e.g., a capacitor-diode (C/D) power factor correction circuit) configured such that the capacitors are coupled to charge when the input voltage is above a predetermined threshold. When the input voltage is below the predetermined threshold, the capacitors are coupled to provide output voltage. One embodiment of correction circuit 110 is described in greater detail below with respect to FIG. 2.

Load 120 receives the rectified and power factor corrected output voltage that is output from clamp circuit 110. In one embodiment, load 120 is a power supply circuit for a computer system that supplies appropriate DC voltage levels. Of course, load 120 may be different type of electrical load.

Figure 2:
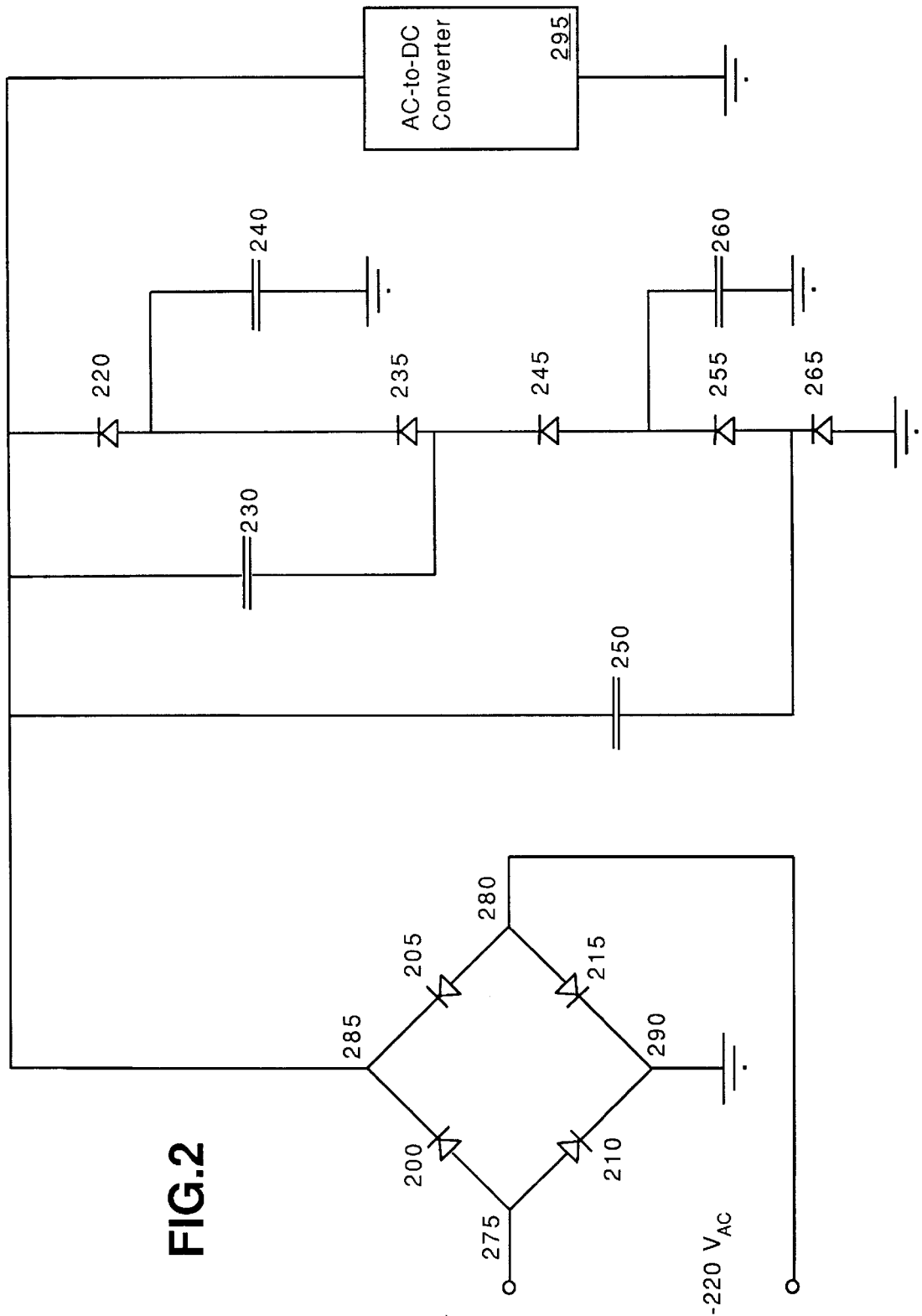
FIG. 2 is one embodiment of a circuit for providing power factor correction according to the present invention.

FIG. 2 is one embodiment of a circuit for providing power factor correction according to the present invention. Generally, diodes 200, 205, 210 and 215 comprise diode bridge 100 of FIG. 1. Diodes 220, 235, 245, 255, 265 and capacitors 230, 240 250, 260 comprise correction circuit 110 of FIG. 1. In one embodiment, the components described with respect to FIG. 2 that provide power factor correction are discrete components. Of course, other types of components, such as surface mount or epoxy packaged components could also be used.

In one embodiment, the power factor correction circuit of the present invention provides a conduction angle of 96° for a voltage half cycle. In other words, the input voltage is passed to the load when the input voltage is greater than ⅔ of peak value. Power is supplied by the charged capacitors for the remaining 84° of the voltage half cycle, or when the input voltage level drops below ⅔ of peak value. Of course, other conduction angles in the same range could be used to provide comparable performance.

In alternative embodiments, the power factor correction circuit of the present invention provides conduction when the input voltage exceeds ¾ of peak level (or greater –⅘, ⅚, etc.). In such an embodiment, the power factor correction circuit provides a conduction angle of 82° and supplies voltage for the remaining 98° of the voltage half cycle. However, such an embodiment have power factor lower than the embodiment described with respect to FIG. 2.

To provide power factor correction with the circuit of FIG. 2, an AC input is applied to nodes 275 and 280. Diode 200 anode and diode 210 anode are commonly coupled to input node 275. Similarly, diode 205 anode and diode 215 anode cathode are commonly coupled to input node 280. The cathodes of diodes 200 and 205 are commonly coupled to positive output terminal 285. The anodes of diodes 210 and 215 are commonly coupled to negative output terminal 290. In one embodiment, negative output terminal 290 is coupled to common for AC-to-DC converter 295, which operates as a load for the power factor correction circuit of FIG. 2. With respect to FIG. 2, diodes 200, 205, 210 and 215 together form a diode bridge.

In one embodiment, the diode bridge receives 220 Volts AC from node 275 to node 280 and produces a rectified voltage at output terminals 285 and 290; however, other input voltages could be input to produce a rectified voltage output. Diodes 220, 235, 245, 255, 265 and capacitors 230, 240 250, 260 form a capacitor-diode (C/D) network to provide power factor correction.

Capacitor 230, diode 235 and capacitor 240 are coupled in series between positive output terminal 285 and negative output terminal 290 with diode 220 coupled between the cathode of diode 235 and the positive output terminal 285. Capacitor 250, diode 255 and capacitor 260 are coupled in series between positive output terminal 285 and negative output terminal 290 with diode 265 coupled between the anode of diode 255 and the negative output terminal 290.

Thus, the two circuit elements described are coupled in parallel with each other across the output terminals of the diode bridge. The power factor correction circuit further comprises a diode coupled between the cathode of diode 255 and the anode of diode 235. Load 120 coupled to receive the output voltage is also coupled in parallel with the diode bridge.

When an AC line voltage is applied to input terminals 275 and 280, the circuit of FIG. 2 operates as follows. Capacitors 230 and 240 are series charged to the peak AC voltage value through the diode bridge and diode 235. Capacitors 250 and 260 are similarly charged through the diode bridge and diode 255. When the capacitance provided by capacitors 240 and 250 are half the capacitance provided by capacitors 230 and 260, the capacitors are charged to the following values:

$$V_{230} = V_{260} = \frac{V_m}{3}$$

and $$V_{240} = V_{250} = \frac{2V_m}{3}$$

where $$V_m = \sqrt{2}\, V_{in,RMS}$$

is the magnitude of the peak input voltage, where $V_{in,RMS}$ is the root mean square of the input voltage. For example, when the input voltage is 220 $V_{AC}$, $V_m$=311 V. In one embodiment, capacitance provided by the capacitors, $C_{eqv}$, is determined according to:

$$C_{eqv} = \frac{C_{230}C_{260}}{C_{230} + C_{260}} + C_{240} + C_{250}$$

It is important to note that the relationship between the capacitances provides the points at which the capacitors start to charge and discharge.

When the voltage at terminals 285 and 290 drops below $$\frac{2V_m}{3},$$

diodes 220, 245 and 265 turn on and connect capacitors 240 and 250 in parallel and capacitors 230 and 260 in series. Capacitors 230, 240, 250 and 260 then deliver power to load 120 until the voltage at terminals 285 and 290 exceeds approximately ⅔ peak value. The current and voltage values corresponding to charge and discharge of capacitors 230, 240, 250 and 260 are described in greater detail below with respect to FIG. 3.

Figure 3:
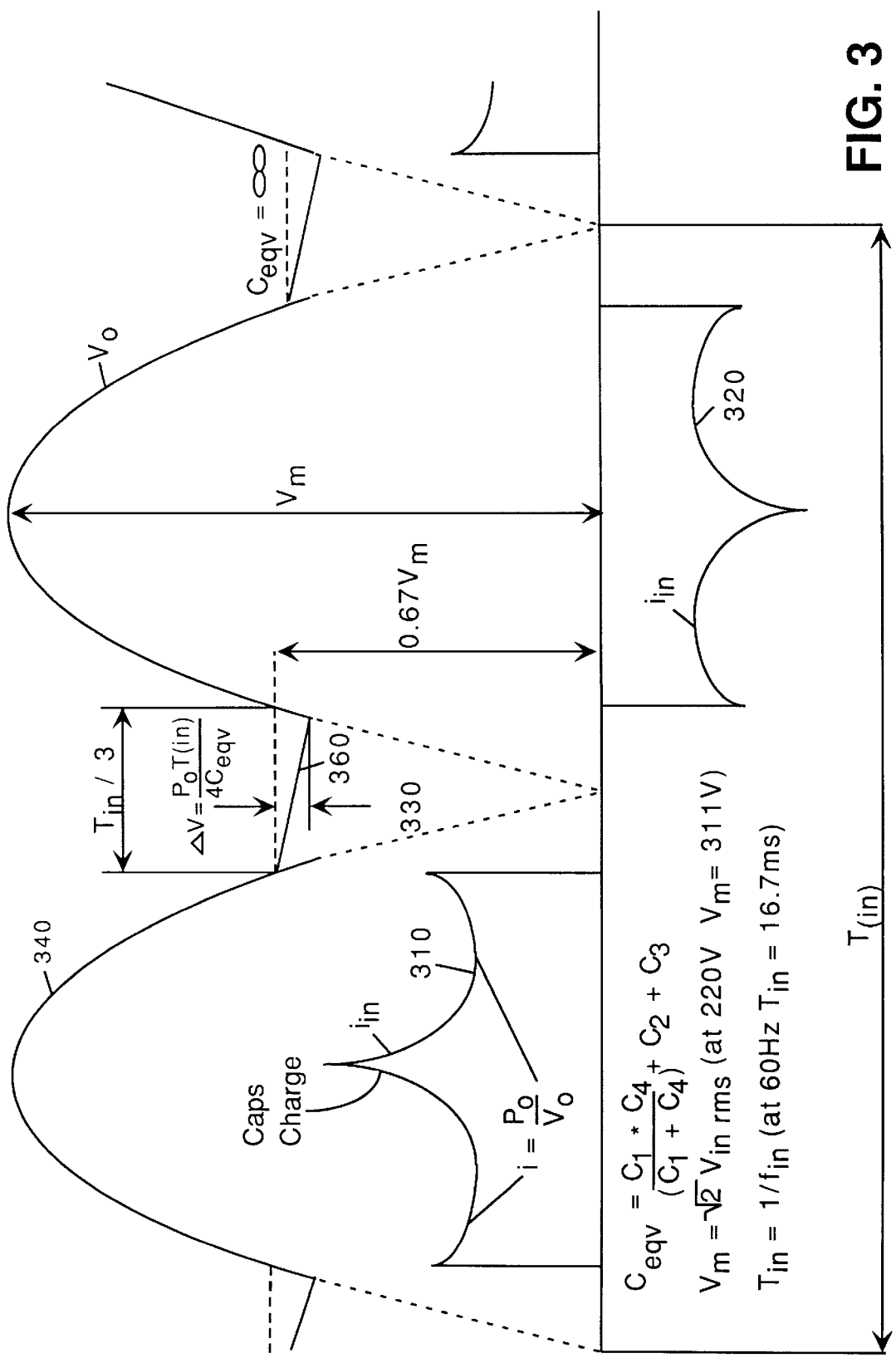
FIG. 3 is one embodiment of a steady state voltage and current wave form diagram for a power factor correction circuit according to the present invention.

FIG. 3 is one embodiment of a steady state voltage and current wave form diagram for a power factor correction circuit according to the present invention. In the wave form diagram of FIG. 3, $T_{in}$ represents a time period corresponding to one cycle of an AC input voltage of magnitude $V_m$. In one embodiment, the AC input alternates at a frequency of 60 Hz, which corresponds to a $T_{in}$ of 16.7 ms because $$T_{in} = \frac{1}{f_{in}}$$

where $f_{in}$ is the frequency of the input voltage.

Current waveform 310 corresponds to the input current to correction circuit 110 and to the load during the positive half cycle of the input voltage to diode bridge 100. The input current ($i_{in}$=$P_o/V_o$) flows through the load and charges capacitors 230, 240, 250 and 260, where $P_o$ and $V_o$ are the power and voltage output by the power factor correction circuit. When input voltage level approaches ≈$V_m$–1.5ΔV (where ΔV is $C_{eqv}$ peak-to-peak ripple voltage) the current that charges capacitors causes $i_{in}$ to increase rapidly. Current waveform 320 corresponds to the negative half cycle of the input voltage provided to diode bridge 100.

Voltage waveform 340 corresponds to the output voltage of correction circuit 110. Dotted waveform 350 corresponds to a rectified sine voltage waveform that would be generated by diode bridge 100 at the load terminals in the case of absence of correction circuit 110. At points in voltage waveform 360 corresponding to ≈0.67 $V_m$, capacitors 230, 240, 250 and 260 discharge energy stored therein. Discharge occurs for one-third ($T_{in}/3$) of the input voltage cycle.

The portion of voltage waveform 340 labeled 360 corresponds to discharge of capacitors 230, 240, 250 and 260. During discharge output voltage drops from ≈0.67 $V_m$ to ≈0.67 $V_m$ $$\approx 0.67V_m - \frac{P_o T_{in}}{2C_{eqv}V_m}.$$

When the voltage input to correction circuit 110 rises above ≈0.67 $V_m$ $$\approx 0.67V_m - \frac{P_o T_{in}}{2C_{eqv}V_m},$$

diodes 220, 235, 245, 255, and 265 are reversed biased and don't conduct current. In this time period the current flows from the bridge 100 directly to the load. Capacitors 230, 240, 250 and 260 start to charge again when input voltage reaches ≈$V_m$−1.5ΔV. The charging of capacitors 230, 240, 250 and 260 continues until the input voltage rises to ≈$V_m$.

The cycle described above repeats for each cycle of input voltage. By providing passive power factor correction at higher output voltage levels the effective power range can be widen up to approximately 500 Watts, that is why the present invention provides more cost-effective power factor correction than the prior art.

Figure 4:
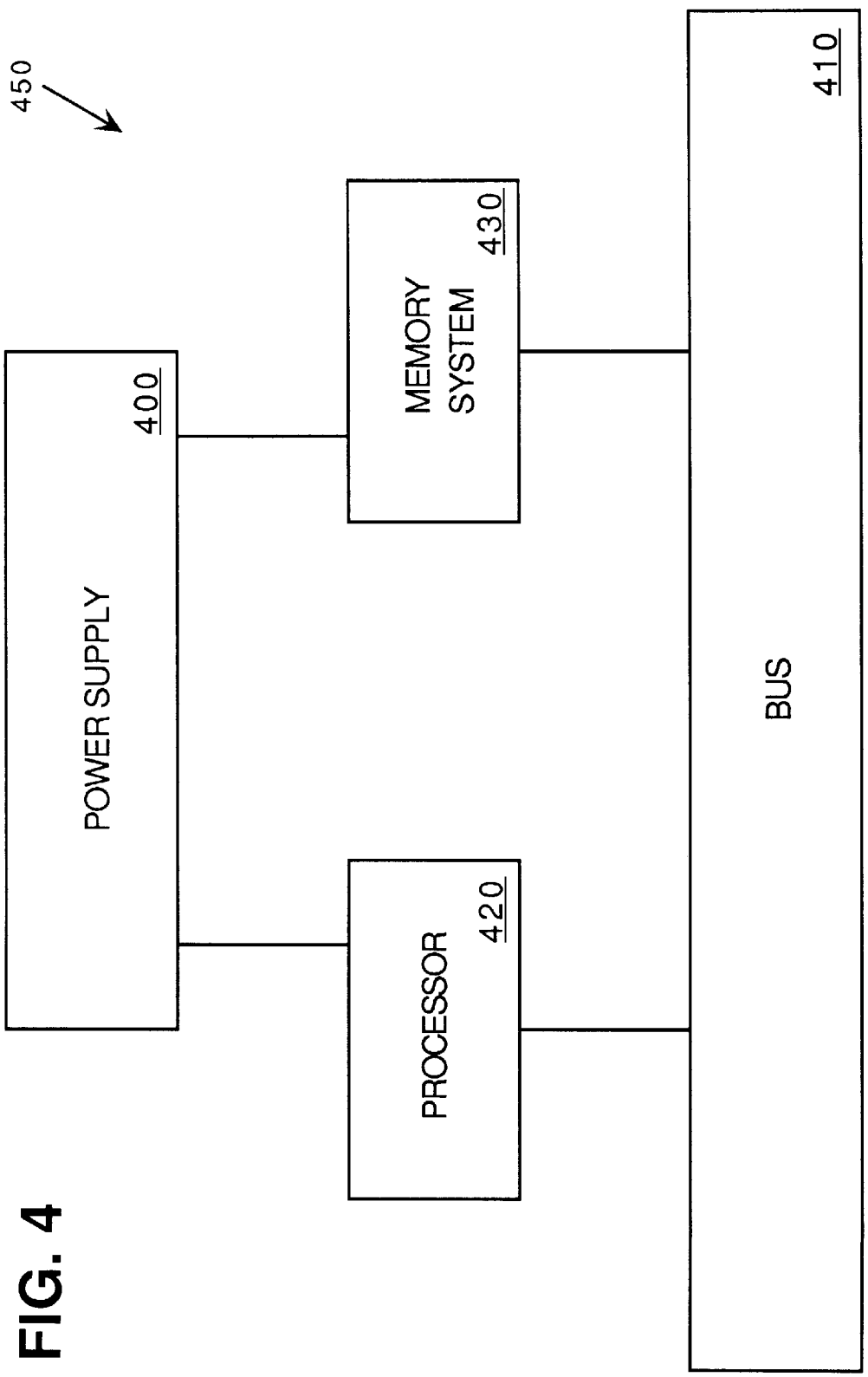
FIG. 4 is one embodiment of a computer system that may be powered by a device providing power factor correction according to the present invention.

FIG. 4 is one embodiment of a computer system that may be powered by a device providing power factor correction according to the present invention. Generally, computer system 450 includes processor 420 and memory system 430, both of which are coupled to bus 410.

In one embodiment, power supply 400 provides power factor correction according to the present invention. Power supply 400 is coupled to provide power to processor 420 and memory system 430.

Computer system 450 may include components and devices in addition to those in FIG. 4, which may be powered by power supply 400. For example, computer system 450 may include a keyboard or other alphanumeric input device, a cursor control device, such as a mouse or trackball and a display device, such as a cathode ray tube (CRT) or liquid crystal display (LCD). In one embodiment, memory system 400 includes dynamic memory, such as dynamic random access memory (DRAM), a cache memory that may be static random access memory (SRAM), or other type of memory. Memory system 400 may also include a read only memory (ROM) and one or more mass storage devices, such as a hard disk drive, a CD-ROM, etc.

Of course, power supply 450 may be used to power devices other than computer systems. For example, power supply 450 may be used to power manufacturing equipment, printers, telephone switching networks and other devices.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A circuit comprising:

a bridge circuit that receives a single alternating current input and provides a rectified voltage waveform output;

a correction circuit that provides a conduction when voltage output from the bridge circuit exceeds a predetermined level for each voltage half cycle and power delivery from storage components otherwise, wherein the correction circuit provides dual charge and discharge paths for the storage components, and further wherein the dual charge and discharge paths each comprise a first path having capacitors coupled in series and a second path having capacitors coupled in parallel.

2. The circuit of claim 1 wherein the predetermined level is ⅔ of a peak voltage level.

3. The circuit of claim 1 wherein the bridge circuit comprises a diode bridge rectifier circuit.

4. A circuit comprising:

a bridge circuit that receives a single alternating current input and provides a rectified voltage waveform output; and a correction circuit coupled to the bridge circuit, the correction circuit to provide conduction when voltage output from the bridge circuit exceeds a predetermined level for each voltage half cycle and power delivery from storage components otherwise, wherein the correction circuit further comprises:

a first correction element having a positive terminal and a negative terminal, wherein the first correction element is coupled in parallel to the output of the bridge circuit, the first correction element providing dual charge and discharge paths for the storage components, and further wherein the dual charge and discharge paths each comprise a first path having capacitors coupled in series and a second path having capacitors coupled in parallel, the first correction element having a first capacitor having a positive terminal and a negative terminal providing the negative terminal of the first correction element, a first diode having a cathode coupled to the positive terminal of the first capacitor, a second capacitor having a positive terminal providing the positive terminal of the first correction element and a negative terminal coupled to an anode of the first diode, and a second diode having an anode coupled to the cathode of the first diode and a cathode coupled t the positive terminal of the second capacitor;

a second correction element having a positive terminal and a negative terminal coupled in parallel with the first correction element, the second correction circuit having a third capacitor having a positive terminal and a negative terminal providing the negative terminal of the second correction element, a third diode having an anode and a cathode coupled to the positive terminal of the third capacitor, a fourth capacitor having a negative terminal coupled to the anode of the third diode and a positive terminal providing the positive terminal of the second correction element, and a fourth diode having a cathode coupled to the anode of the third diode and an anode coupled to the negative terminal of the second correction element; and a fifth diode having an anode coupled to the cathode of the third diode and a cathode coupled to the anode of the first diode.

5. The circuit of claim 1 further comprising a load coupled to the correction circuit.

6. The circuit of claim 5 wherein the load is an alternating current to direct current converter.

7. An apparatus comprising:
- a rectifier circuit coupled to receive an alternating current input voltage;
- a correction circuit coupled to the rectifier circuit to receive an output of the rectifier circuit, the correction circuit providing a 96° conduction angle for a half voltage cycle and storing power for 84° of the half voltage cycle.

8. The apparatus of claim 7 further comprising an alternating current to direct current converter.

9. A method of providing power factor correction, the method comprising:
- receiving a single alternating current voltage;
- generating a rectified voltage signal based on the alternating current voltage;
- supplying power from the bridge when the rectified voltage signal exceeds a predetermined voltage level;
- storing power in capacitors when power is supplied from the bridge, wherein power is supplied to the capacitors with a dual charge path, wherein the dual charge paths comprise a first path having capacitors coupled in series and a second path having capacitors coupled in parallel; and
- supplying voltage from the capacitors via dual discharge paths when the rectified voltage does not exceed the predetermined voltage level, wherein the dual discharge paths comprise a first path having capacitors coupled in series and a second path having capacitors coupled in parallel.

10. The method of claim 9, wherein the predetermined level is ⅔ of a peak voltage level.

11. A method for providing power factor correction comprising the steps of:
- receiving an alternating current voltage;
- generating a rectified voltage level from the alternating current voltage;
- charging a plurality of capacitors for 96° of a voltage half cycle; and
- supplying voltage from the plurality of capacitors for 84° of the voltage half cycle.

12. An apparatus for providing power factor correction, the apparatus comprising:
- means for receiving a single alternating current voltage;
- means for generating a rectified voltage signal based on the alternating current voltage;
- means for storing power in capacitors when power is supplied from the bridge, wherein power is supplied to the capacitors with a dual charge path, wherein the dual charge paths comprise a first path having capacitors coupled in series and a second path having capacitors coupled in parallel; and
- means for supplying voltage from the capacitors via dual discharge paths when the rectified voltage does not exceed the predetermined voltage level, wherein the dual discharge paths comprise a first path having capacitors coupled in series and a second path having capacitors coupled in parallel.

13. An apparatus for providing power factor correction comprising:
- means for receiving an alternating current voltage;
- means for generating a rectified voltage level from the alternating current voltage;
- means for charging a plurality of capacitors for 96° of a voltage half cycle; and
- means for supplying voltage from the plurality of capacitors for 84° of the voltage half cycle.

* * * * *

UNITED STATES PATENT AND TRADEMARK OFFICE
CERTIFICATE OF CORRECTION

PATENT NO. : 6,018,472
DATED : January 25, 2000
INVENTOR(S) : Vogman

Page 1 of 1

It is certified that error appears in the above-identified patent and that said Letters Patent is hereby corrected as shown below:

Column 3:
Line 32, delete "cathode".

Signed and Sealed this

Twelfth Day of June, 2001

*Attest:*

*Attesting Officer*

NICHOLAS P. GODICI
*Acting Director of the United States Patent and Trademark Office*